United States Patent [19]

Ogawa et al.

[11] Patent Number: 4,539,691
[45] Date of Patent: Sep. 3, 1985

[54] METHOD AND APPARATUS FOR ENCODING A BINARY DIGITAL INFORMATION SIGNAL

[75] Inventors: Hiroshi Ogawa; Tamotsu Yamagami, both of Tokyo, Japan

[73] Assignee: Sony Corporation, Tokyo, Japan

[21] Appl. No.: 416,685

[22] Filed: Sep. 10, 1982

[30] Foreign Application Priority Data

Sep. 11, 1981 [JP] Japan ................. 56-143618

[51] Int. Cl.³ .............................................. H04L 3/00
[52] U.S. Cl. .............................. 375/37; 340/347 DD; 358/261
[58] Field of Search ................... 375/18, 19, 106, 112, 375/34, 37; 358/261; 340/347 DD; 360/40, 48; 371/55, 57

[56] References Cited

U.S. PATENT DOCUMENTS

| | | | |
|---|---|---|---|
| 3,423,728 | 11/1963 | Wissel | 375/57 |
| 3,631,471 | 12/1971 | Griffiths | 371/55 |
| 3,862,371 | 1/1975 | Neustadt | 375/25 |
| 3,995,264 | 11/1976 | Ouchi | 340/347 DD |
| 4,020,282 | 4/1977 | Halpern | 375/34 |
| 4,121,264 | 10/1978 | Kishi et al. | 360/27 |
| 4,191,974 | 3/1980 | Ono et al. | 358/261 |
| 4,231,100 | 10/1980 | Eggermont | 375/34 |
| 4,231,101 | 10/1980 | Eggermont | 375/34 |
| 4,296,439 | 10/1981 | Teramura et al. | 358/261 |
| 4,327,379 | 4/1982 | Kadakia et al. | 358/261 |
| 4,387,364 | 6/1983 | Shirota | 358/261 |

OTHER PUBLICATIONS

Franaszek, "Sequence-State Methods for Run-Length Limited Coding", IBM J Res Develop, pp. 376-383.
Patel, "Charge-Constrainer Byte-Oriented (0,3) Code", IBM Technical Disclosure Bulletin, vol. 19, No. 7, Dec. 1976.

Primary Examiner—Robert L. Griffin
Assistant Examiner—Stephen Chin
Attorney, Agent, or Firm—Lewis H. Eslinger; Alvin Sinderbrand

[57] ABSTRACT

A system for encoding a binary digital information signal comprised of 8-bit information words occurring within a frequency band to produce an encoded binary digital information signal comprised of 17-bit channel words formed of 14-bit information words and 3-bit separation words and with the encoded signal satisfying the d- and k-constraint rules, reducing DC imbalance and having substantially reduced components thereof in a predetermined undesirable lower frequency range of the frequency band, the system converting each 8-bit information word into a 14-bit information word; generating a set of four possible 3-bit separation words for use each 14-bit information word which satisfy the d- and k-constraint rules; determining an integrating transfer function characteristic having a high gain with respect to the predetermined frequency range; obtaining a step response by modifying each 14-bit information word and each respective possible 3-bit separation word by the integrating transfer function characteristic; evaluating the step response for a predetermined number of 14-bit information words and respective possible 3-bit separation words, either separately for each word or at the end of each possible 17-bit channel word, to obtain values including information with respect to the predetermined frequency range; selecting the possible 3-bit separation word for each 14-bit information corresponding to a respective one of the values which is closest to zero; and adding each selected 3-bit separation word to each respective 14-bit information word to produce a plurality of 17-bit channel words which form the encoded binary digital information signal.

20 Claims, 26 Drawing Figures

METHOD AND APPARATUS FOR ENCODING A BINARY DIGITAL INFORMATION SIGNAL

BACKGROUND OF THE INVENTION

This invention relates generally to a system for encoding binary data words into a converted digital code for transmission and, more particularly, is directed to a system for encoding binary data words into a converted digital code for transmission and having a format with substantially no components thereof in a predetermined undesirable frequency range.

In digital transmission systems and in magnetic and optical recording/reproducing systems, the information to be transmitted or to be recorded is presented as a sequence of symbols. These symbols collectively form an alphabet, which for binary data is a binary alphabet consisting of the symbols "1" and "0". One symbol, for example, the "1", can be recorded in accordance with a non-return-to-zero-mark (NRZ-M) code as a transition between two states of magnetization in the case of a magnetic disc or tape, or between two states of intensity or focus in the case of an optical disc. The other symbol, the "0", is recorded by the absence of such a transition. As discussed in greater detail below, certain system requirements in practice impose constraints on the order in which these symbols may occur.

Some systems are required to be self-clocking. This implies that the sequence of symbols to be transmitted or to be recorded should have sufficient transitions, that is, should be of a so-called run length limited (RLL) code, so that a clock signal, which is required for detection and synchronization, can be generated and regulated by the sequence of symbols alone. Accordingly, a predetermined maximum distance between two consecutive transitions on the recording medium, and consequently, a maximum time interval ($T_{max}$) corresponding therewith, of the signal to be recorded, must be provided. A further requirement may be that certain symbol sequences are forbidden in the information signal, as these sequences are intended for special purposes, for example as a synchronizing sequence. If the synchronizing sequence is mimicked by a sequence in the information signal, the information signal destroys the unambiguity of the synchronizing sequence, and consequently, renders the synchronizing sequence unsuitable for its intended purpose.

It may further be required that the transitions not follow too closely after each other in order to limit intersymbol interference. In the case of magnetic or optical recording, the latter requirement may also be related to the information density on the recording medium. For example, if the predetermined minimum distance between two consecutive transitions on the recording medium, and consequently, the minimum time interval ($T_{min}$) corresponding therewith, of the signal to be recorded is increased, the information density is increased substantially to the same extent, that is, with the same ratio. Also, the required minimum bandwidth ($B_{min}$) relates to the minimum time interval $T_{min}$ between transitions, that is, $B_{min} = 1/2\ T_{min}$.

A method of encoding data to satisfy the above requirements is disclosed in U.S. patent application Ser. No. 06/286,982, filed July 27, 1981, and having a common assignee herewith. In particular, as described therein, the encoded binary digital signal must satisfy a d-constraint rule and a k-constraint rule, as follows:

(a) d-constraint rule - two "1"-type symbols must be separated by a run of at least d consecutive symbols of the "0" type; and (b) k-constraint rule - the maximum length of a run of consecutive symbols of the "0" type is k.

For example, if a stream of binary data is considered as consecutive sequential words each having m data bits, the words can be encoded into corresponding code words of n information bits, where $n>m$. Since $n>m$, the number of possible code words ($2^n$) far exceeds the number of different data words ($2^m$), and only those code words need be used which satisfy the d-constraint rule and the k-constraint rule. In other words, if the d- and k-constraint rules are imposed on the code words of n information bits to be transmitted or recorded, the $2^m$ different words map onto a corresponding $2^m$ words of information bits out of a total possible number of $2^n$ such words. Thus, the mapping of data words into code words is carried out so that only those code words are used that satisfy the k-constraint and d-constraint rules.

In addition, it is desirable to maintain the DC component of the sequence of symbols as close to zero as possible, because information channels are not normally responsive to direct current and any DC component of the transmitted or recorded signal is likely to be lost. It has therefore been proposed in the aforementioned U.S. patent application Ser. No. 06/286,982, to add a redundant or separation word, for example, of three bits, to each encoded binary digital word to form a new channel word with substantially no DC components, that is, in which DC imbalance is substantially reduced, while also satisfying the d-constraint and k-constraint rules. For example, with such method, an m-bit digital word is mapped onto an $n_1$-bit digital word which satisfies the d-constraint and k-constraint rules and in which a transition between a high and low state is provided for each occurrence of a "1" bit in each $n_1$-bit word. The instantaneous value of the integration of an encoded signal is called the digital sum value (DSV), and includes information about the DC content of the signal. More particularly, the closer that the DSV is to zero, the fewer DC components exist in the signal. In this manner, an $n_2$-bit redundant word can be added to each $n_1$-bit word to form a new n-bit channel word in which the DSV is as close to zero as possible, while also satisfying the d-constraint and k-constraint rules.

The above system is only directed to reducing DC imbalance, while satisfying the d-constraint and k-constraint rules. However, it may also be desirable to provide that the encoded binary digital signal has substantially no components in a predetermined undesirable frequency range. For example, with an optical disc reproducing apparatus, a binary digital information signal is recorded on an optical disk by the presence or absence of pits thereon. In particular, with such apparatus, an optical laser beam may be reflected from the surface of the recording medium to detect the presence or absence of pits and the spacing between adjacent pits, whereby the reflected laser beam is modulated by the binary digital information on the recording medium. The reflected laser beam is then detected to produce a detection or information signal containing the recorded information. However, if a stain or flaw, such as a fingerprint, exists on the disc, the detection signal may become distorted by an asymmetrical AM component thereof, and reproduction with high fidelity is therefore not achieved. Since the added component from the fingerprint appears as a low frequency component, it is desirable that the reproduced binary digital information signal has a format with substantially no components in such low frequency spectrum caused by the fingerprint, whereby reproduction with high fidelity can be achieved.

Another problem that may result with such optical disc reproducing apparatus relates to the tracking of the pits within the tracks on the disc. In particular, tracking by a servo mirror and the depth of focus of a servo lens of the apparatus are controlled on the basis of the envelope of the reproduced detection signal. However, low frequency components of the detection signal itself may cause a drift in the envelope thereof, resulting in inaccurate tracking and focusing of the laser beam. In addition, as a result of a phase compensation operation, the tracking loop has a saturation phenomenon which results in a track jump and which is further influenced by the low frequency components of the detection signal. Accordingly, it is desirable to provide that the reproduced detection signal has a format with substantially no components thereof in a predetermined low frequency range.

OBJECTS AND SUMMARY OF THE INVENTION

Accordingly, it is an object of this invention to provide a method and apparatus for encoding a binary digital information signal that avoids the above-described difficulties encountered in the prior art.

More particularly, it is an object of this invention to provide a method and apparatus for encoding a binary digital information signal so that the encoded binary digital information signal has a format with substantially reduced components thereof in a predetermined frequency range.

It is another object of this invention to provide a method and apparatus for encoding a binary digital information signal such that the encoded binary digital information signal has a format with substantially reduced components thereof in a predetermined frequency range, minimizes DC imbalance and satisfies the d-constraint and k-constraint rules.

In accordance with an aspect of this invention, a method is provided of encoding a binary digital information signal comprised of m-bit words occurring within a frequency band to produce an encoded binary digital information signal comprised of n-bit channel words, each n-bit channel word being comprised of an $n_1$-bit information word where $n_1 > m$ and an $n_2$-bit separation word, and the encoded binary digital information signal having a format with substantially reduced components thereof in a predetermined frequency range of the frequency band, the method comprising the steps of converting each m-bit word into an $n_1$-bit word; generating a set of possible $n_2$-bit separation words for use with each $n_1$-bit information word; separately adding each possible $n_2$-bit separation word to each $n_1$-bit information word, to provide at least one n-bit channel word corresponding to each $n_1$-bit information word; determining an integrating transfer function characteristic including information with respect to the predetermined frequency range; modifying each of the n-bit channel words by the integrating transfer function characteristic to produce a step response; evaluating the step response at predetermined evaluation times to obtain a parameter having a value including information with respect to the predetermined frequency range; selecting one of the possible $n_2$-bit separation words for each of said $n_1$-bit information words that yields a value of the parameter which is closest to zero; and adding the selected one of the possible $n_2$-bit separation words following each respective one of the $n_1$-bit information words to form the encoded binary digital information signal having the format with substantially reduced components thereof in the predetermined frequency range.

The above, and other, objects, features and advantages of the invention will become apparent from the following detailed description of illustrative embodiments of the invention which is to be read in connection with the accompanying drawings.

DETAILED DESCRIPTION OF THE PREFERRED EMBODIMENTS

Referring to the drawings in detail, and initially to FIGS. 1A-1E thereof, there is illustrated a known scheme for encoding words of binary data into a sequence of channel words of binary bits. In particular, if the original data is considered as a sequence of m-bit information words (not shown), for example, where $m=8$, each 8-bit word can be transformed or mapped onto a corresponding $n_1$-bit binary digital information word comprised of a plurality of "1" and "0" bits, where the "1" bits correspond to a transition between two states of magnetization in the case of a magnetic disc or tape, or between two states of intensity or focus in the case of an optical disc, in accordance with a non-return-to-zero-mark (NRZ-M) code, and the "0" bits correspond to the absence of such a transition. For explanation purposes only, $n_1=14$. It is to be appreciated that $n_1>m$ so that the $2^m$ 8-bit possible combinations of "1" and "0" bits are mapped onto $2^m$ combinations out of $2^n$ possible combinations of "1" and "0" bits in order to satisfy the d-constraint and k-constraint rules. For example, as aforementioned, where $m=8$ and $n_1=14$, only 256 14-bit words need be selected from a total of more than 16,000 possible 14-bit words. For $n_1=14$, $d=2$ and $k=10$, there are 277 possible combinations of 14-bit words which will satisfy the d-constraint and k-constraint rules. In the example shown in FIGS. 1A-1E, d is chosen to be equal to two and k is chosen to be equal to ten, that is, $d=2$ and $k=10$.

In the aforementioned U.S. patent application Ser. No. 06/286,982, filed July 27, 1981, having a common assignee herewith, and the disclosure of which is incorporated herein by reference, an $n_2$-bit redundant word or separation word WR is added to each 14-bit encoded binary digital information word, for example, where $n_2=3$, so as to minimize the DC imbalance of the resulting encoded signal, while ensuring that the d-constraint and k-constraint rules are not violated. In this manner, n-bit channel words are formed of $n_1+n_2$ bits, as shown in FIGS. 1B-1E. It is to be appreciated that the new channel words must also satisfy the d-constraint and k-constraint rules. Accordingly, in the case where $d=2$, only the redundant words (000), (100), (010), (001) can be used, these redundant words WR each being shown combined with an information word WI in FIGS. 1B-1E, respectively. As previously stated, the purpose of the d-constraint rule is to ensure that the transitions (corresponding to "1" bits) do not follow to closely upon one another. Further, the choice of such redundant words WR satisfies the k-constraint rule where $k=10$. As previously stated, the k-constraint rule permits the encoded signal to be self-clocking. Accordingly, a redundant word WR is added to each information word WI to form a sequence of channel words, as shown in FIGS. 1B-1E.

Figure 7:
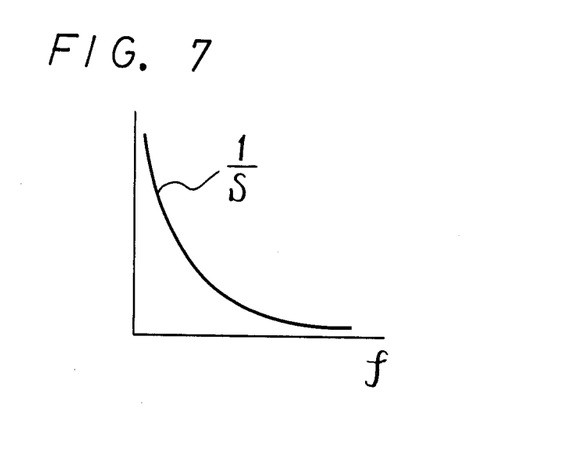
FIG. 7 is a graphical diagram of a pure integrating transfer function.

As previously stated, the "1" bits in the encoded channel words correspond to transitions between two states of magnetization in the case of a magnetic disc or tape, or between two states of intensity or focus in the case of an optical disc, in accordance with a non-return-to-zero-mark (NRZ-M) code, while the "0" bits correspond to the absence of such a transition. Consequently, a pulse waveform WF, shown for each of the cases of FIGS. 1B-1E, is provided to be transmitted or to be recorded on a magnetic or optical medium. It is to be appreciated that the waveform WF will have a direct current imbalance to the extent that the positive portions, that is, those portions following an upward transition, exceed the corresponding negative portions, that is, those portions following a downward transition. If, for example, the levels of the waveform WF are at values of $+1$ and $-1$, respectively, the imbalance is then just equal to the running integral of the waveform WF, that is, the instantaneous value of the integration (by the integration characteristic of FIG. 7) of the pulse waveform WF, shown by the dashed lines in FIGS. 1B-1E. The measure commonly used for the DC imbalance is the digital sum value (DSV). Generally, the amount of DC imbalance, which reduces the signal-to-noise ratio, corresponds to the DSV.

Figure 1A:
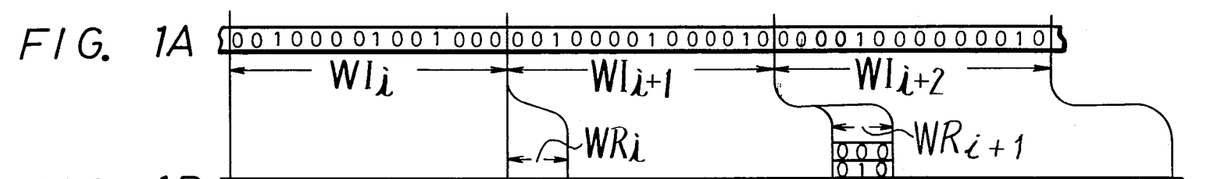
FIGS. 1A–1E are schematic diagrams used for explaining one known method of encoding a binary digital information signal which is run length limited.
Figure 1B:
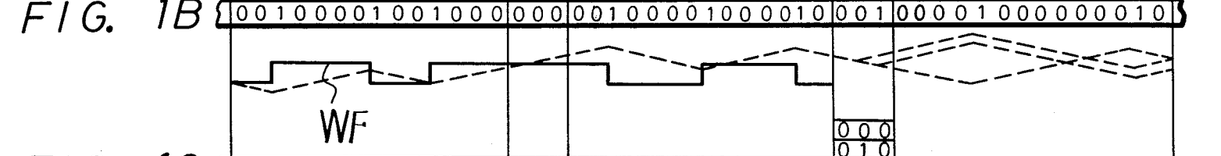
Figure 1C:
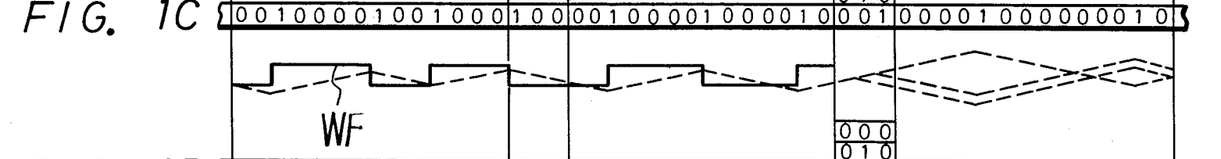
Figure 1D:
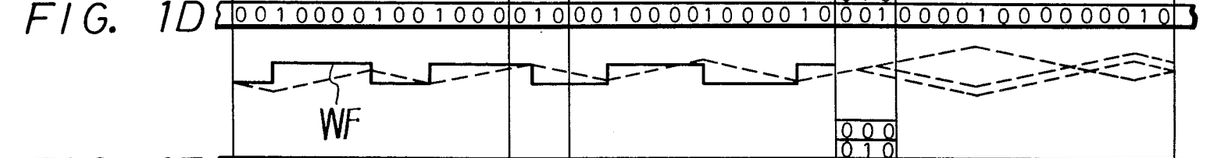
Figure 1E:
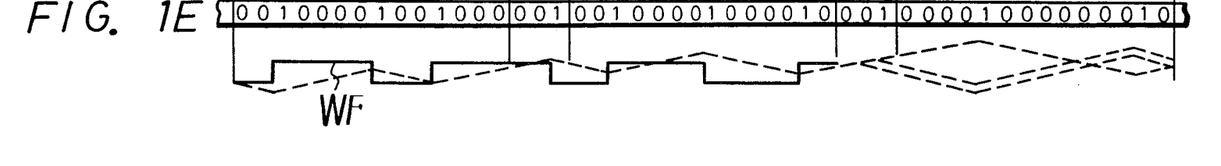

Accordingly, the redundant word WR at the end of each information word WI is selected so that the DSV at the end of each new channel word is as close to zero as possible to minimize the DC imbalance. For example, as shown in FIG. 1B, for the case where the redundant word $WR_i$ (000) is added to the information word $WI_i$, a digital sum value of $+7$ is obtained at the terminal end of the newly formed channel word, that is at the end of redundant word $WR_i$ (000). On the other hand, for redundant words $WR_i$ (100), (010) and (001), as shown in FIGS. 1C-1E, respectively, the digital sum values are $+1$, $+3$ and $+5$, respectively. Thus, the addition of the redundant word $WR_i$ (100), as shown in FIG. 1C, results in the newly formed channel word having the lowest digital sum value and thereby providing the greatest minimization of DC imbalance. If the evaluation point for the DSV is taken at the end of each newly formed channel word, the redundant word WR which provides the lowest DSV for each information word WI can be selected to minimize the DC imbalance of the encoded information signal.

Figure 2A:
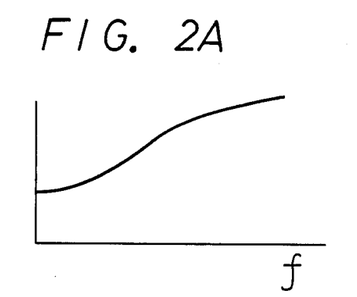
FIGS. 2A and 2B are graphical diagrams used for explaining the result of the method of FIGS. 1A–1E.
Figure 2B:
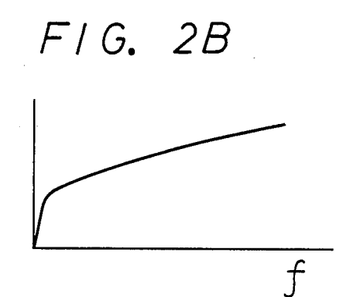

Because the above-described method does not change the transmitted information words themselves, but only effects changes by adding the redundant words, the above method imposes no additional burden on decoding apparatus for receiving the transmitted signal or for cutting back the recorded signal. In other words, the data pattern occurring in the redundant words WR can be disregarded during decoding or demodulation. In addition, if the frequency spectrum of the information words WI is shown in FIG. 2A, for example, a redundant word can be added to each information word to provide newly formed channel words having a format with substantially no DC components, as shown in FIG. 2B, by using the above-described method. It is to be appreciated that the evaluation point of the DSV to determine the redundant word $WR_i$ need not occur at the terminal end of redundant word $WR_j$. In other words, it may be possible to provide an evaluation point at the terminal end of information word $WR_{i+2}$, for example, or at any other suitable place, such that each redundant word WR is evaluated over a plurality of information words.

Figure 3:
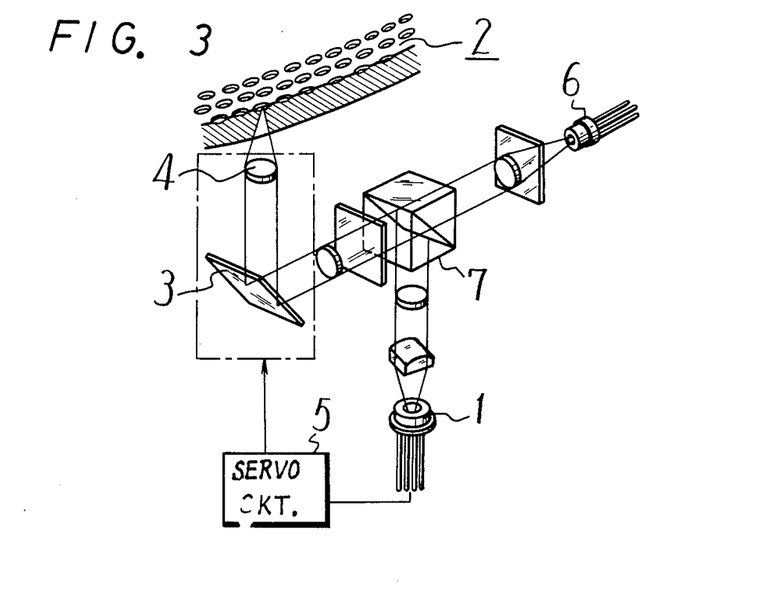
FIG. 3 is a schematic diagram of a portion of an optical disc reproducing apparatus with which the present invention can be used.
Figure 4A:
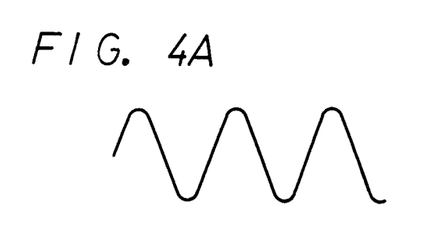
FIGS. 4A–4C are waveform diagrams used for explaining the affect of a stain or flaw on the signal reproduced by the apparatus of FIG. 3 with known methods of encoding.
Figure 4B:
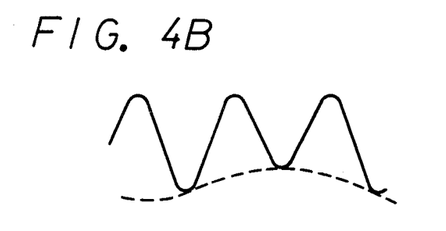
Figure 4C:
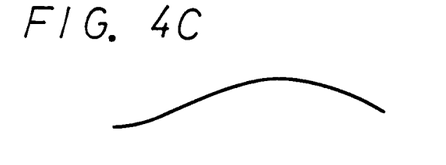
Figure 5:
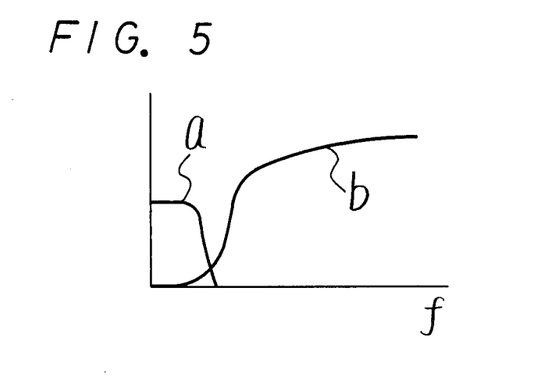
FIG. 5 is a graphical diagram illustrating a desirable characteristic to be imparted to the reproduced detection signal to overcome the disadvantage of the stain or flaw shown in FIGS. 4A–4C.

With the above-described method, however, only the DC component of the information signal is effectively suppressed or avoided, while no such suppression occurs over the low frequency range of the signal. Accordingly, various problems still remain. For example, with an optical disc reproducing apparatus, as illustrated in FIG. 3, a transition between two states of intensity or focus is represented by the presence or absence of a pit on a record disc 2. A laser light source 6 produces a laser beam which passes through a half mirror 7 and is reflected by a servo mirror 3 and focused by a servo lens 4 onto record disc 2. The laser beam is modulated by the information recorded by the presence and absence of pits thereon and is reflected back through servo lens 4 and servo mirror 3 onto half mirror 7, which then reflects the modulated laser beam to a detector 1 which produces a reproduced information or detection signal, as shown in FIG. 4A. However, if a stain or flaw exists on the record disc, distrotion in the from of an asymmetrical AM component appears on the detection signal. For example, if a fingerprint exists on record disc 2, the reproduced signal corresponding thereto, shown in FIG. 4C, causes distortion in the reproduced information signal, as shown in FIG. 4B, so that reproduction with high fidelity is not achieved. In order to avoid such deleterious effect, it is desirable that the channel words have a format with substantially no components thereof in the frequency range of the fingerprint. For example, if the frequency range of the reproduced signal caused by the fingerprint is shown by curve a in FIG. 5, it is desirable that the channel words occupy a frequency range shown by curve b in FIG. 5. In this manner, the information signal can be reproduced so as to avoid the undesirable frequency range of curve a.

Figure 6A:
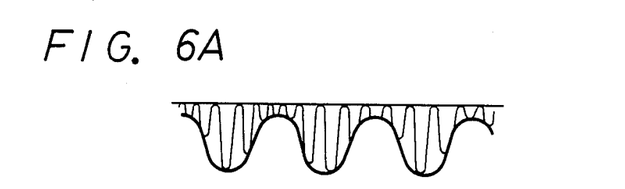
FIGS. 6A and 6B are waveform diagrams used for explaining undesirable tracking and focusing drift caused by low frequency components of the detection signal reproduced by the apparatus of FIG. 3 with known methods of encoding.
Figure 6B:
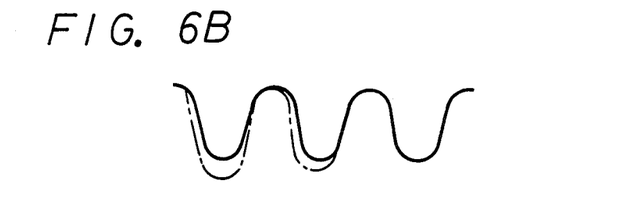

Another problem that may result relates to the servo mechanism used for tracking and focusing of the laser beam onto recording disc 2. In particular, in the optical disc reproducing apparatus of FIG. 3, a servo circuit 5 is provided which controls servo mirror 3 and servo lens 4 in response to the envelope of the detection signal from detector 1 so that the laser beam accurately tracks and is accurately focused on recording disc 2. Generally, the frequency spectrum of the envelope is much lower than the frequency spectrum of the detection signal itself, as shown in FIG. 6A. However, low frequency components of the detection signal close to the servo frequency band may cause a drift in the envelope, as shown by the one-dot chain line in FIG. 6B. This, of course, may result in errors in the tracking and focusing servo operations which are normally operated by level drift. Further, a phase compensation characteristic is added to ensure a stable servo operation, thereby increasing the gain in the servo frequency band. Thus, if a low frequency component of the detection signal exists in such servo frequency band, a large noise component enters into the servo tracking loop, thus causing a saturation phenomenom which may result in a track jump.

As previously stated, the method described in the aforementioned U.S. patent application. Ser. No. 06/286,982 only functions to reduce the DC component in the encoded information signal. Accordingly, the present invention provides a method of encoding a binary digital information signal in which the latter signal has a format with substantially no components thereof in a predetermined undesirable frequency range, for example, a predetermined low frequency range, and not merely at the single DC frequency. This is accomplished by selecting the redundant word and the recording medium related thereto. In accordance with the present invention, a transfer function having an integrating characteristic and including information with respect to the frequency range to be suppressed is determined, for example, the frequency range from the DC component to the frequency of the fingerprint on the record medium, or the frequency range for the servo operation. The pulse signal WF is then modified by the transfer function characteristic to produce a step response and the value or level of the step response is obtained at an evaluation point. The redundant word WR is then selected to reduce this value at the evaluation point to a value as close to zero as possible.

Figure 8:
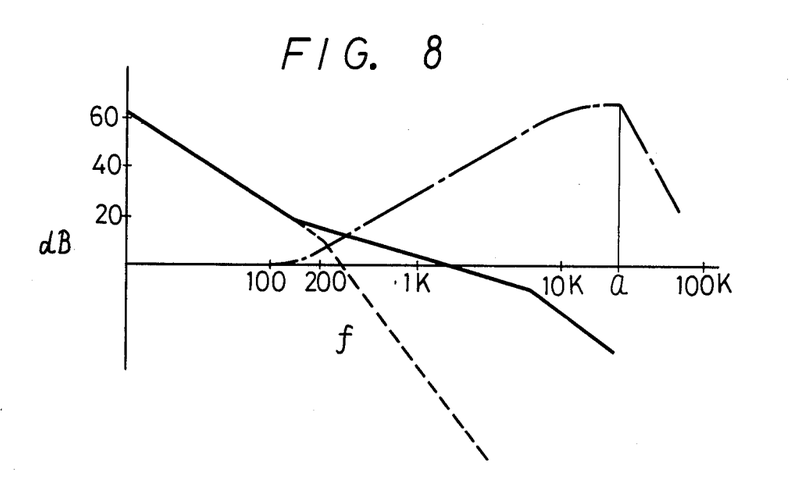
FIG. 8 is a graphical diagram used for explaining the frequency characteristic of the servo system of the optical disc reproducing apparatus of FIG. 3 with which the present invention can be used.
Figures 9, 10:
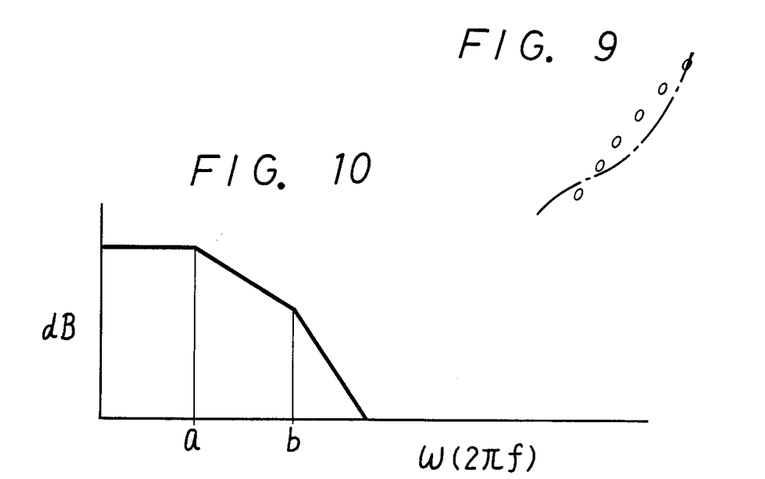
FIG. 9 is a schematic diagram used for explaining mistracking of the pits on a record disc caused by low frequency components in the servo system shown in FIG. 3.
FIG. 10 is a graphical diagram of a transfer function characteristic that can be employed by the present invention for producing a binary digital information signal having a format with substantially no components thereof in the low frequency range of FIG. 8.

A specific example of the method according to the present invention will now be described for a run length limited code of the block conversion type and which is provided so that the detection signal produced by detector 1 (FIG. 3) does not produce an external disturbance in the tracking servo operation. In particular, the frequency characteristic of the servo system of FIG. 3 is shown in FIG. 8 in which the solid line represents the overall servo system characteristic comprised of, for example, servo circuit 5 and servo mirror 3 in FIG. 3. Accordingly, if the broken line in FIG. 8 represents the frequency characteristic of, for example, servo mirror 3, the frequency characteristic of servo circuit 5 must have the one-dot chain characteristic also shown in FIG. 8 to obtain the overall characteristic indicated by the solid line. If the channel words have a format with components in the frequency range of the servo system, as shown in FIG. 8, accurate tracking at the center of the tracks on the recording disc will not be achieved, as shown by the one-dot chain line in FIG. 9. For example, if the wavelength of the laser beam is 0.8 $\mu$m and the numerical aperture of the servo lens is approximately 0.45, a maximum tracking deviation of 0.1 $\mu$m must be provided for accurate tracking. Accordingly, if the channel words have a format with high level components in the frequency range of the servo system, the tracking deviation becomes large and mistracking occurs, as shown in FIG. 9.

Further, in order to ensure a stable servo operation, it is generally necessary to provide the servo compensation band characteristic shown by the one-dot chain line in FIG. 8. As a result, the gain is increased in this frequency range. Thus, if the channel words include components in this frequency range, a large noise component is introduced into the servo loop, resulting in the aforementioned saturation phenomenon in the system, which may result in a track jump. This is particularly true for the case where the cut-off frequency of the servo device is low and the gain for the servo compensation band characteristic is large.

In accordance with the present invention, it is therefore desirable that the redundant words are chosen such that the channel words have a format with substantially no components thereof in the predetermined frequency range of the servo system, that is, between 0 Hz (DC) and a KHz, for example, where a=20. In this manner, components of the channels words will not result in an external disturbance of the servo system, and therefore, no mistracking will occur.

In accordance with the present invention, a transfer function is determined containing information regarding the frequency spectrum to be suppressed. For example, to provide suppression of the frequency spectrum between 0 Hz and 20 KHz, that is, to provide the encoded binary digital information signal with substantially no components in such frequency range, the transfer function of FIG. 10, having an integrating characteristic, is first determined. It is to be appreciated that the transfer function of FIG. 10 provides a high gain for components in the frequency range between 0 Hz and 20 KHz (a), where the frequency a in FIG. 10 corresponds to the frequency a in FIG. 8. As an example, the frequency b in FIG. 10 can be equal to 40 KHz. In this manner, the transfer function of FIG. 10 contains much information regarding the frequency range to be suppressed.

The transfer function of FIG. 10 can be represented as follows:

$$G(S) = \frac{C}{(S + a)(S + b)}, \quad (1)$$

where a corresponds to the corner or break frequency of 20 KHz, b corresponds to the corner or break frequency of 40 KHz and C is a constant. Accordingly, the step response Y of the transfer function is obtained as follows:

$$Y = G(S) \cdot \frac{1}{S} = \frac{C}{(S + a)(S + b)} \cdot \frac{1}{S} \quad (2)$$

$$= \frac{C}{a(a - b)(S + a)} + \frac{C}{b(b - a)(S + b)} + \frac{C}{abS}.$$

The instantaneous value y(t) of the step response Y is then obtained as follows:

$$y(t) = \frac{C}{a(a - b)} e^{-at} + \frac{C}{b(b - a)} e^{-bt} \frac{C}{ab}. \quad (3)$$

Figure 11:
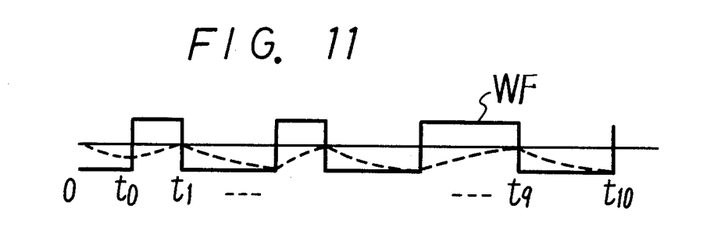
FIG. 11 is a time chart used for explaining the operation of the transfer function characteristic of FIG. 10 on a pulse signal in accordance with one embodiment of the present invention.

Thus, for example, if the pulse wave form WF shown in FIG. 11 is modified by the transfer function characteristic FIG. 10, a step response shown by the broken line in FIG. 11 is obtained. The instantaneous balue y(t) of the step response at $t = t_{10}$ can be obtained by using equation (3) as follows:

$$\begin{aligned} y(t)_{t=t10} &= -y(2T) + y(2T) - y(2T) + y(T) \\ &\quad -y(2T) + y(T) - y(T) \\ &= -2y(2T) + y(T), \end{aligned} \quad (4)$$

where $y(t)_{t=0} = 0$. In this manner, the instantaneous value y(t) at $t = t_{10}$ corresponds to the DSV obtained in respect to the information words of FIGS. 1A-1E, while also including information regarding the frequency band of the servo system which is desired to be suppressed. It is to be appreciated that the method of encoding according to the present invention can be utilized in much the same manner as the method previously described in regard to FIG. 1. In particular, each of the four redundant words WR (000), (100), (010) and (001) are each separately added or catenated with each 14-bit information word WI and the step response of the pulse signal WF (FIGS. 1B-1E) is then produced by modifying each channel word by the integrating transfer function characteristic of FIG. 10, in much the same manner as previously discussed in regard to FIG. 11. The instantaneous value of the step response is then obtained at the end of each channel word and the redundant word WR is chosen corresponding to the channel word having the instantaneous value of the step response which is closest to zero. As a result, the channel word has a format with substantially no components thereof in the predetermined frequency range, for example, in the frequency range between 0 Hz and 20 KHz. It is to be appreciated, of course, that the terminal ends of any of the following information words $WI_{i+2}$, $WI_{i+3}$, ... can be utilized as the evaluation points to determine which of the redundant words WR (000), (100), (010), (001) produces an optimum result.

Figure 12:
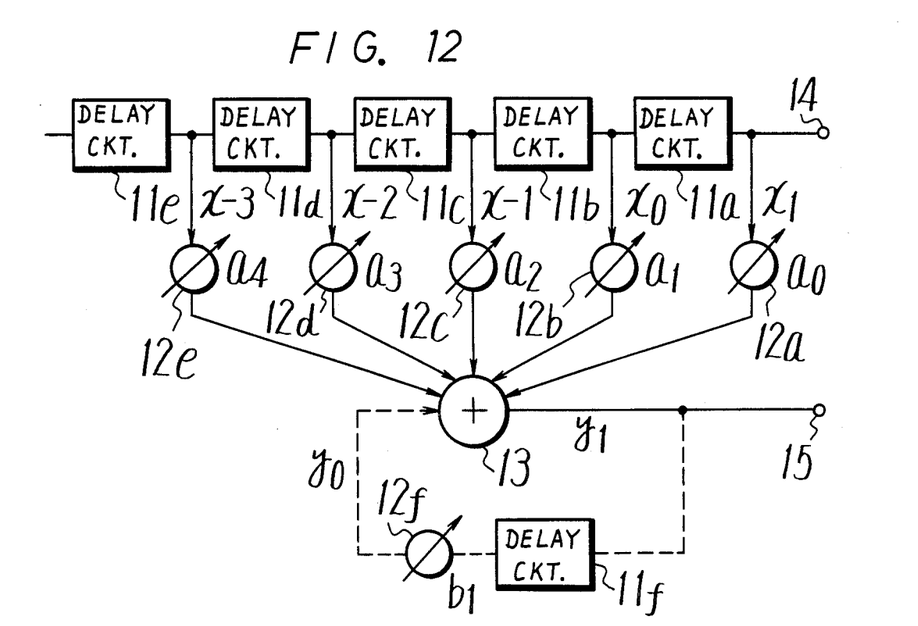
FIG. 12 is a block diagram of a transversal filter according to one embodiment of the present invention.
Figure 13:
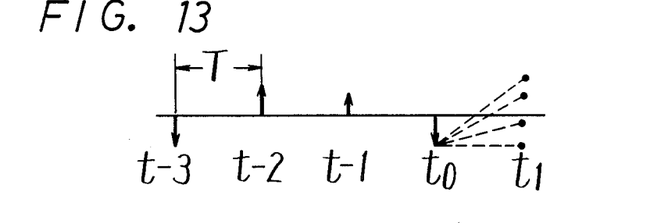
FIG. 13 is a time chart used for explaining the operation of the transversal filter of FIG. 12.
Figure 14:
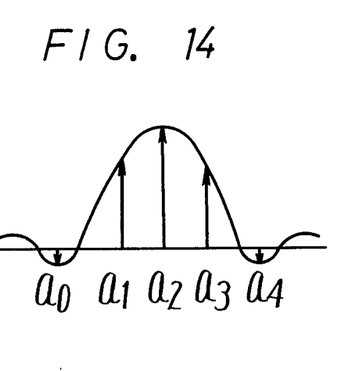
FIG. 14 is a pulse response of the filter characteristic for the transversal filter of FIG. 12.

In a modification of the present invention, a transversal filter is used for determining a smoothed instantaneous value corresponding to a plurality of instantaneous values of the step response. In particular, as shown in FIG. 12, the transversal filter includes a plurality of delay circuits 11a–11d, each functioning to delay the input signal supplied thereto by a predetermined time, for example, equal to the time T for transmitting one channel word. Accordingly, the signal at the output of delay circuit 11d is delayed from the signal at the input of delay circuit 11a by 4T. In such case, the instantaneous values $x_1$, $x_0$, $x_{-1}$, $x_{-2}$, $x_{-3}$ obtained at input terminal 14 and at the outputs of delay circuits 11a–11d, respectively, are supplied to an adding circuit 13 through weighting circuits 12a–12e, respectively. The instantaneous values $x_{-3}$, $x_{-2}$, $x_{-1}$, and $x_0$ are represented by arrows at times $t_{-3}$, $t_{-2}$, $t_{-1}$, and $t_0$, respectively, in FIG. 13. It is to be appreciated that four values of the instantaneous value $x_1$ are shown in FIG. 13 at time $t_1$ since there are four possible redundant words that can be added to the corresponding information word $WI_1$. Weighting circuits 12a–12e weight the signals supplied thereto by an amount $a_0$–$a_4$, respectively, the latter values being determined by the pulse response of the filter characteristic of the transversal filter of FIG. 12, as shown in FIG. 14, in which the horizontal axis of FIG. 14 represents time and the values $a_0$–$a_4$ are separated by a time period T. The smoothed instantaneous value y(t) is then produced at output terminal 15 as an output of the transversal filter and is used to determine the redundant word to be added to the information word at time $t_1$. In particular, the output of the transversal filter of FIG. 12 at output terminal 15 can be represented as follows:

$$y_n + \sum_{k=0}^{m} a_k x_{n-k}, \quad (5)$$

where n = 0,1,2,3 corresponding to the four redundant words that can be added to the information word at time $t_1$. For example, the instantaneous value $y_1$ can be expanded and represented as follows:

$$y_1 = a_0 x_1 + a_1 x_0 + a_2 x_{-1} + a_3 x_{-2} + a_4 x_{-3} \quad (6)$$

Figure 15:
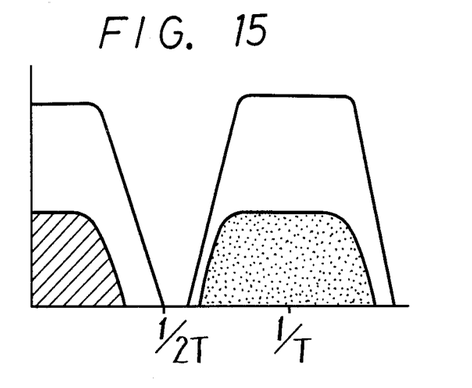
FIG. 15 is a graphical diagram used for explaining the transfer function characteristic of the transversal filter of FIG. 12.

Thereafter, the values $y_0$, $y_1$, $y_2$ and $y_3$ are compared and the redundant word at time $t_1$ is used which yields the value of $y_n$ which is closest to zero. This redundant word is then added to the information word $WI_1$, at time $t_1$. If the transfer function characteristic of FIG. 10 is represented by the hatched area in FIG. 15, the transversal filter of FIG. 12 has the effective transfer function characteristic shown by the solid line at the left side of FIG. 15 and surrounding the hatched area. As a result, components of the encoded binary digital information signal in the predetermined frequency range which is desired to be suppressed are substantially reduced. The dotted area transfer function characteristic and the solid line transfer function characteristic surrounding the dotted characteristic in FIG. 15 are the aliasing characteristics corresponding to the characteristics at the left-hand side of FIG. 15 for producing the aliasing components. The latter aliasing components result because the step response is not only calculated for each period T, but also for each period 1/T. However, the latter aliasing components need not be suppressed.

A further modification of the present invention is shown by the dashed line in FIG. 13 in which the output of adder 13 is fed back to the input thereof through a delay circuit 11f and a weighting circuit 12f having a weighting value $b_1$, thereby providing a transversal filter of the cyclic type so as to obtain better control of the output signal. Accordingly, the output signal of such transversal filter becomes as follows:

$$y_n = \sum_{k=1}^{N} b_k y_{n-k} + \sum_{k=0}^{M} a_k x_{n-k}. \quad (7)$$

It is to be appreciated that only one weighting circuit 12f is provided in the feedback path having a single weighting characteristic $b_1$. Accordingly, equation (7) effectively reduces as follows:

$$y_n = b_1 y_{n-1} + \sum_{k=0}^{M} a_k x_{n-k}. \quad (8)$$

It is to be appreciated that many modifications may be made within the scope of the present invention as defined in the claims herein. For example, although only four delay circuits 11a and 11d are shown, whereby only five instantaneous $x_1 \ldots x_{-3}$ are used, any number of instantaneous values may be used merely by providing additional delay circuits, such as delay circuit 11e shown in FIG. 12 with additional weighting circuits. Further, although the present invention has been described in regard to a run length limited code of the block conversion type, a run length limited code of the convolutional type, for example, may also be used. This is because evaluation of the DSV for a run length limited code of the convolutional type does not yield satisfactory band suppression, as described above with respect to the previously known method.

It is to be appreciated that, by merely changing the transfer function, components in various desired predetermined frequency ranges of the encoded binary digital information signal can be easily suppressed.

It is to be further appreciated that the transversal filter of FIG. 12 uses previously determined values $x_{-3}$, $x_{-2}$, $x_{-1}$ and $x_0$ at times $t_{-3}$, $t_{-2}$, $t_{-1}$ and $t_0$, respectively, to determine which of the four redundant words WR should be added to the $n_1$-bit information word WI at time $t_1$. However, instead of using previously determined values of the step response at times $t_{-3}$, $t_{-2}$, $t_{-1}$ and $t_0$, subsequent values of the step response at times $t_2$, $t_3$ and so on may be used to determine the redundant word WR at time $t_1$, or alternatively, a combination of subsequent values at times $t_2$, $t_3$ and so on and previous values at times $t_0$, $t_{-1}$ and so on may be used to determine the redundant word WR to be added to the information word WI at time $t_1$.

Figure 17:
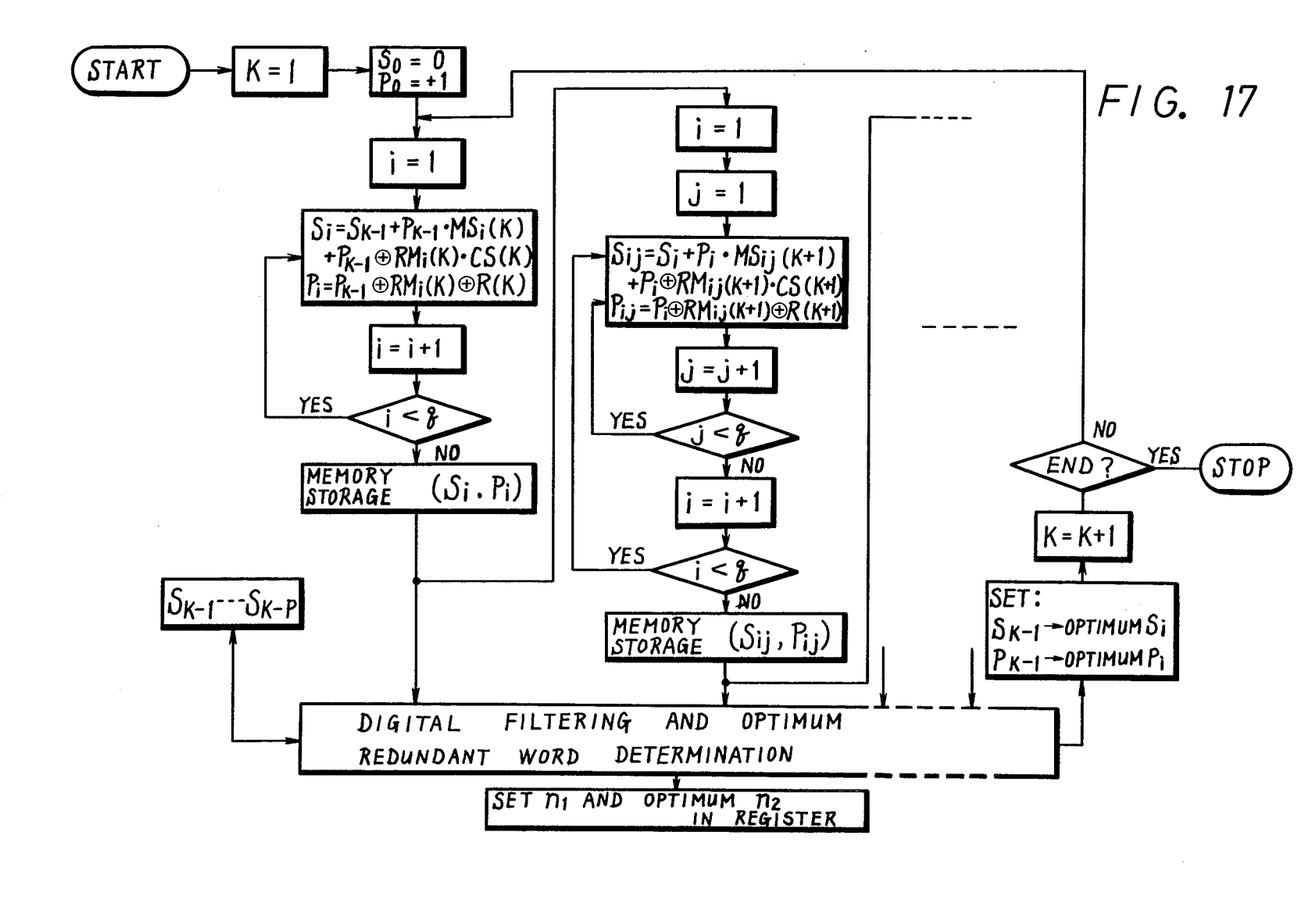
FIG. 17 is a flow chart diagram used for explaining the method used with the decision tree-time chart of FIG. 16.

A flow chart diagram for providing such determination is shown in FIG. 17. As shown therein, at the start of the operation, the following parameters are initially set as follows: $k=1$, $S_0=0$ and $P_0=+1$, where k represents the number of the information word WI for which the redundant word WR is to be calculated, $S_0$ represents a preset value x of the step response prior to beginning the calculation and $P_0$ represents a preset polarity of the step response at such time. It is to be remembered that a "1" bit in an information word WI represents a transition between two different states, whereas a "0" bit represents an absence of such transition. Accordingly, if the NRZ-M encoded information word has an even number of "1" bits, the level of the pulse form WF of the information word at the end thereof will be the same as the level at the beginning of the information word, that is, either high or low, and the polarity P thereof is represented by $+1$. On the other hand, if the NRZ-M encoded information word has an odd number of "1" bits, the level of the pulse form WF thereof will be different at the leading and trailing ends, and accordingly, the polarity P thereof is represented by $-1$. In this manner, the preset polarity $P_0$ is initially set at $+1$.

Figure 16:
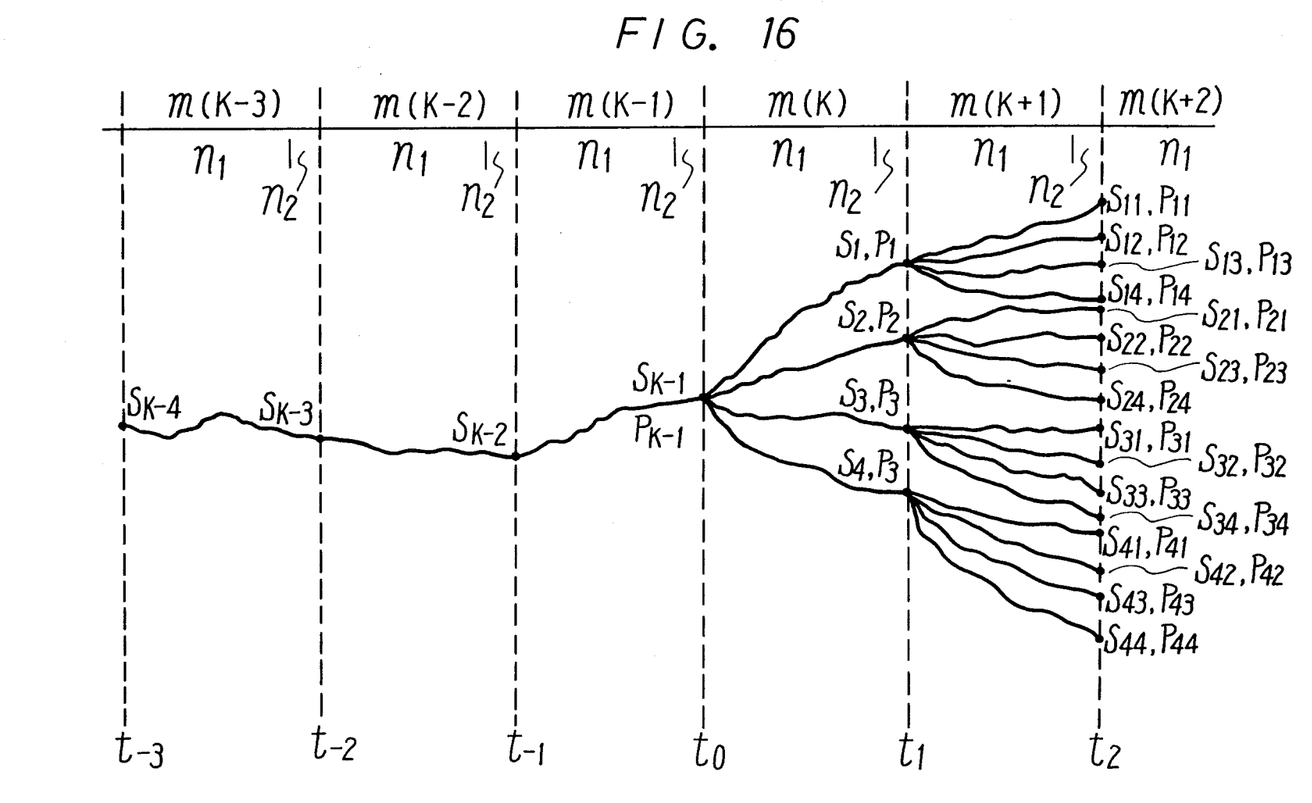
FIG. 16 is a decision tree-timing chart for illustrating a method of encoding according to another embodiment of the present invention.

Thereafter, a variable i is set equal to one, that is, $i=1$, and the value S of the step response at time $t_1$ is determined for the $n_1$-bit information word WI(k), as shown in FIG. 16 for each of the four possible redundant words WR (000), (100), (010) and (001). In particular, the value S of the step response and the polarity P of the information word WI(k) with each possible $n_2$-bit redundant word WR(k) added thereto is determined by the following equations:

$$S_i = S_{k-1} + P_{k-1} \cdot MS_i(k) + \quad (9)$$
$$P_{k-1} + RM_i(k) \cdot CS(k),$$
$$P_i = P_{k-1} + RM_i(k) + R(k). \quad (10)$$

It is to be appreciated that, since four possible redundant words can be added to the $n_1$-bit information word WI(k), a loop operation is performed in which i is continuously incremented by one until the value q is obtained, in which the maximum value of q is equal to four, corresponding to the four possible redundant words that can be added to the information word. In this regard, the values $S_1$, $P_1$; $S_2$, $P_2$; $S_3$, $P_3$ and $S_4$, $P_4$ are determined and stored in a memory.

After the values $S_i$, $P_i$ for $i=1, 2, 3, 4$ are determined, these values are supplied to the next stage of the flow chart diagram which also initially presets $i=j=1$. In response to the value $S_i$, $P_i$ and by use of a nested loop, the next possible 16 values S of the step response and values P of the polarity at time $t_2$ are calculated, as shown in FIG. 16, in accordance with the following equations:

$$S_{ij} = S_i + P_i \cdot MS_{ij}(k+1) + \quad (11)$$
$$P_i + RM_{ij}(k+1) \cdot CS(k+1),$$
$$P_{ij} = P_i + RM_{ij}(k+1) + R(k+1). \quad (12)$$

Then, the values $S_{ij}, P_{ij}$ for $i=j=1, 2, 3, 4$ are stored in a memory and are supplied to the next stage of the flow chart for calculation of the next possible 64 redundant bits that can be added to the information word at time $t_3$, and so on, as long as desired. In addition, previous values $S_{k-1}$, $S_{k-2} \ldots S_{k-p}$ can be used in the determination. Accordingly, all of these values $S_{k-1} \ldots S_{k-p}$, $(S_i, P_i)$, $(S_{ij}, P_{ij})$ and so on are supplied to a circuit which weights these signals in much the same manner as the transversal filter of FIG. 12 and determines the optimum redundant word to be added to the information word at time $t_1$. It is to be appreciated that this determination is performed in order to obtain a value of the step response at a subsequent time, for example, time $t_4$, which is closest to zero. Thereafter, the $n_1$-bit information word at time $t_1$ and the optimum $n_2$-bit redundant word are written into a register. In addition, after such determination has been made, the value $S_{k-1}$ for determination of the next four possible redundant words at time $t_2$ is set equal to the optimally determined value $S_i$. In like manner, the polarity $P_{k-1}$ is set equal to the optimally determined polarity $P_i$. In addition, the value k is incremented by one. If the incremented value of k is greater than the value k for the last information word to be processed, the operation stops. If not, the aforementioned reset values $S_{k-1}$, $P_{k-1}$ and k are supplied to the beginning of the flow chart where the operation is again repeated, for example, for the information word at time $t_2$.

Figure 18:
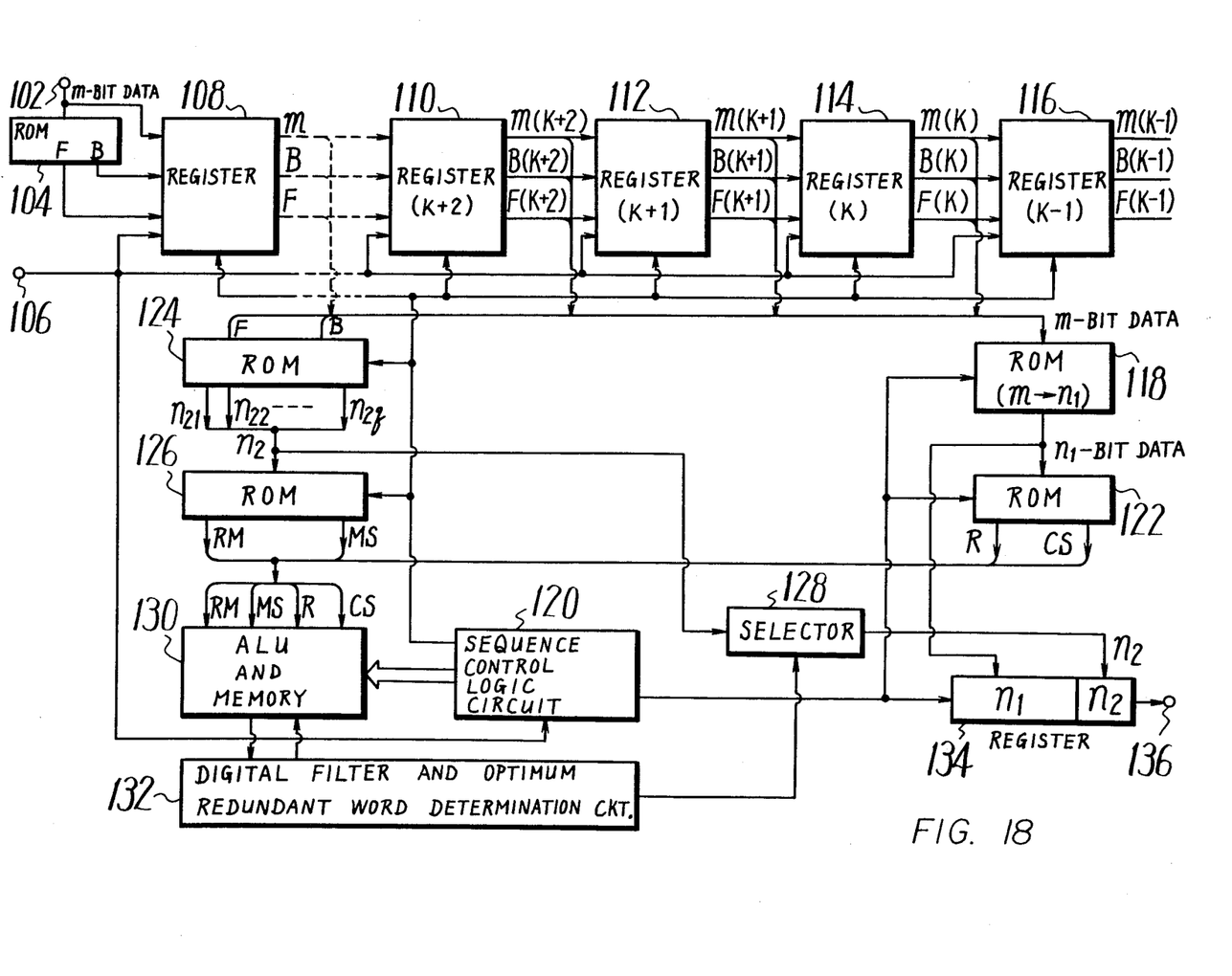
FIG. 18 is a block diagram of apparatus for performing the method according to the flow chart diagram of FIG. 17.

Referring now to FIG. 18, apparatus for performing the method described with respect to the flow chart of FIG. 17 will now be described. As shown therein, m-bit data is supplied from an information terminal 102 to a read-only memory (ROM) 104 which, in response thereto, produces an output signal F corresponding to the number of "0" bits at the front or leading end of the $n_1$-bit encoded information word corresponding to the m-bit information word, and an output signal B corresponding to the number of "0" bits at the back or trailing end of the corresponding $n_1$-bit information word. The output signals F and B from ROM 104, along with the m-bit data from input terminal 102 and a clock pulse CK from a clock input terminal 106 are supplied to a register 108. Thereafter, when the next m-bit information word from input terminal 102 is supplied to register 108, along with output signals F and B from ROM 104 corresponding thereto, the data stored in register 108 is sequentially transferred to succeeding registers, for example, registers 110, 112, 114 and 116, and as many other registers as desired. The latter registers are also supplied with the clock signal CK from clock input terminal 106. The m-bit information stored in the registers is supplied to a ROM 118 under the control of a sequence control logic circuit 120. ROM 118 functions to convert the m-bit information words into corresponding $n_1$-bit information words, for example, as disclosed in the aforementioned U.S. patent application Ser. No. 06/286,982, and which $n_1$-bit information words are supplied to a ROM 122. For each $n_1$-bit information word, ROM 122 produces a signal CS corresponding to the value of the step response of the $n_1$-bit information word and a signal R corresponding to the polarity of such word. In addition, the output signals F and B from registers 108, 110, 112, 114, also on are supplied to a ROM 124 which determines the possible $n_2$-bit redundant words that can be added to each respective $n_1$-bit information word supplied to ROM 122. It is to be appreciated that, with the embodiment discussed in the present application, a maximum of four possible redundant words are disclosed that can be added to each $n_1$-bit information word, that is, $n_{21}$ . . . $n_{2q}$, where q=4, although the present invention is not limited thereby. The possible $n_2$-bit bit redundant words are supplied to a ROM 126 which produces a signal MS corresponding to the value of the step response of each $n_2$-bit redundant word and a signal RM corresponding to the polarity of each such redundant word. In addition, each possible $n_2$-bit redundant word from ROM 124 is supplied to a selector circuit 128 which may include a memory for storing the $n_2$-bit words.

The signals CS and R from ROM 122 and the signals MS and RM from ROM 126 are supplied to an arithmetic logic unit (ALU) and memory 130 (hereinafter referred to as ALU 130) controlled by sequence control logic circuit 120. In particular, ALU 130 produces an evaluation signal corresponding to the aforementioned value S of the combined step response for each possible channel word (information word and redundant word) and a signal corresponding to the polarity P therefor, as previously described in regard to the flow chart diagram of FIG. 17. As previously discussed in regard to the latter flow chart diagram, a digital filter and optimum redundant word determination circuit 132 determines the value of the step response for the possible combinations of subsequent channel words which is closest to zero, for example, at time $t_4$. In response thereto, digital filter and optimum redundant word determination circuit 132 supplies a signal to selector circuit 128 which then selects the optimally determined $n_2$-bit redundant word to be added to the information word, for example, at time $t_1$. Selector circuit 128 supplies this $n_2$-bit redundant word to a register 134 which is also supplied with the corresponding $n_1$-bit information word from ROM 118. Register 134 thereby produces an output n-bit channel word comprised of the $n_1$-bit information word and the optimally determined $n_2$-bit redundant word at an output terminal 136. Thereafter, the apparatus repeats the operation for the next information word until the last information word is processed in this manner. In the above-described apparatus, sequence control logic circuit 120 controls the sequence of operations for all of registers 108, 110, 112, 114, 116 and 134, ROMs 118, 122, 124 and 126 and ALU 130.

It is to be appreciated that a complementary method and a complementary apparatus for decoding are to be provided during reproduction and that the construction of such latter apparatus could readily be provided by one skilled in the art from the method and apparatus according to the present invention as disclosed herein. For example, a synchronizing signal can be added to the encoded binary digital information signal and, upon reproduction, the encoded binary digital information signal can be extracted in response to the synchronizing signal, the $n_2$-bit separation word can be separated from each n-bit channel word, and the remaining $n_1$-bit information words can be converted back to their corresponding m-bit information words.

Having described specific preferred embodiments of the invention with reference to the accompanying drawings, it is to be understood that the present invention is not limited to those precise embodiments and that various changes and modifications may be effected therein by one skilled in the art without departing from the scope or spirit of the invention as described in the appended claims therein.

What is claimed is:

1. A method of encoding a binary digital information signal comprised of m-bit information words occurring within a frequency band to produce an encoded binary digital information signal comprised of n-bit channel words, each n-bit channel word being comprised of an $n_1$-bit information word where $n_1 > m$ and an $n_2$-bit separation word, and said encoded binary digital information signal having a format with substantially reduced components thereof in a predetermined frequency range of said frequency band, said method comprising the steps of:

converting each m-bit information word into an $n_1$-bit information word;

generating a set of possible $n_2$-bit separation words for use with each $n_1$-bit information word;

determining an integrating transfer function characteristic including information with respect to said predetermined frequency range;

evaluating a step response, obtained by modifying each said $n_1$-bit information word and each respective possible $n_2$-bit separation word by said integrating transfer function characteristic, at at least one predetermined evaluation time to obtain a parameter having an overall value including information with respect to said predetermined frequency range;

selecting the one of said possible $n_2$-bit separation words for each of said $n_1$-bit information words in response to the value of said parameter; and adding said selected ones of said possible $n_2$-bit separation words following each respective one of said $n_1$-bit information words to form said encoded binary digital information signal having said format with substantially reduced components thereof in said predetermined frequency range.

2. A method according to claim 1; in which said step of determining includes the step of determining an integrating transfer function characteristic having a high gain for signals occurring within said predetermined frequency range.

3. A method according to claim 1; in which said step of evaluating includes the step of evaluating said step response separately for each $n_1$-bit information word and each $n_2$-bit separation word to obtain said parameter separately for said $n_1$-bit information words and said $n_2$-bit separation words, each said separately obtained parameter having a respective separately obtained value including information with respect to said predetermined frequency range, and the step of combining respective ones of said separately obtained values to obtain said overall value.

4. A method according to claim 1; in which said step of selecting includes the step of selecting the one $n_2$-bit separation word for each of said $n_1$-bit information words that corresponds to the overall value of said parameter which is closest to zero.

5. A method according to claim 1; in which said step of evaluating includes the step of evaluating said step response at a plurality of evaluation times, with successive evaluation times being separated by the occurrence of a plurality of $n_1$-bit information words and corresponding $n_2$-bit separation words.

6. A method according to claim 1; in which said step of evaluating includes the step of evaluating said step response at a plurality of evaluation times to obtain a plurality of values of said parameter including information with respect to said predetermined frequency range, and the step of obtaining said overall value in response to said plurality of values.

7. A method of encoding a binary digital information signal comprised of m-bit information words occurring within a frequency band to produce an encoded binary digital information signal comprised of n-bit channel words, each n-bit channel word being comprised of an n-bit information word where $n_1 > m$ and an $n_2$-bit separation word, and said encoded binary digital information signal having a format with substantially reduced components thereof in a predetermined frequency range of said frequency band, said method comprising the steps of:

converting each m-bit information word into an $n_1$-bit information word;

generating a set of possible $n_2$-bit separation words for use with each $n_1$-bit information word;

separately adding each possible $n_2$-bit separation word to each $n_1$-bit information word, to provide at least one n-bit channel word corresponding to each $n_1$-bit information word;

determining an integrating transfer function characteristic including information with respect to said predetermined frequency range;

modifying each said n-bit channel word by said integrating transfer function characteristic to produce a step response;

evaluating said step response at at least one predetermined evaluation time to obtain a parameter having an overall value including information with respect to said predetermined frequency range;

selecting the one of said possible $n_2$-bit separation words for each of said $n_1$-bit information words that yields a value of said parameter which is closest to zero; and adding said selected ones of said possible $n_2$-bit separation words following each respective one of said $n_1$-bit information words to form said encoded binary digital information signal having said format with substantially reduced components thereof in said predetermined frequency range.

8. A method according to claim 7; in which said step of determining includes the step of determining an integrating transfer function characteristic having a high gain for signals occurring within said predetermined frequency range.

9. A method according to claim 7; in which said step of evaluating includes the step of evaluating said step response for each n-bit channel word.

10. A method according to claim 7; in which said step of evaluating includes the step of evaluating said step response for a plurality of said n-bit channel words to obtain a plurality of values of said parameter.

11. A method according to claim 10; in which said step of evaluating includes the step of weighting said plurality of values to obtain a plurality of weighted values, and the step of combining said weighted values to obtain said overall value.

12. A method of encoding a binary digital information signal comprised of m-bit information words occurring within a frequency band to produce an encoded binary digital information signal comprised of n-bit channel words, each n-bit channel word being comprised of an $n_1$-bit information word where $n_1 > m$ and an $n_2$-bit separation word, and such that, in a continuous stream of said channel words, a d-constraint rule is satisfied in which a minimum of d consecutive bits of one type exist between bits of the other type and a k-constraint rule is satisfied in which a maximum of k consecutive bits of said one type exist between said bits of the other type, and said encoded binary digital information signal is produced with substantially reduced components thereof in a predetermined frequency range of said frequency band, said method comprising the steps of:

converting each m-bit information word into an $n_1$-bit information word;

generating a set of possible $n_2$-bit separation words for use with each $n_1$-bit information word so that said d-constraint rule and said k-constraint rule are satisfied;

separately adding each possible $n_2$-bit separation word to each $n_1$-bit information word, to provide at least one n-bit channel word corresponding to each $n_1$-bit information word;

determining an integrating transfer function characteristic including information with respect to said predetermined frequency range;

modifying each said n-bit channel word by said integrating transfer function characteristic to produce a step repsonse;

evaluating said step response at at least one predetermined evaluation time to obtain a parameter having an overall value including information with respect to said predetermined frequency range;

selecting the one of said possible $n_2$-bit separation words for each of said $n_1$-bit information words that yields a value of said parameter which is closest to zero; and adding said selected ones of said possible $n_2$-bit separation words following each respective one of said $n_1$-bit information words to form said encoded binary digital information signal having said format with substantially reduced components thereof in said predetermined frequency range.

13. Apparatus for encoding a binary digital information signal comprised of m-bit information words occurring within a frequency band to produce an encoded binary digital information signal comprised of n-bit channel words, each n-bit channel word being comprised of an $n_1$-bit information word where $n_1 > m$ and an $n_2$-bit separation word, and said encoded binary digital information signal having a format with substantially reduced components thereof in a predetermined frequency range of said frequency band, said apparatus comprising:

means for converting each m-bit information word into an $n_1$-bit information word;

means for generating a set of possible $n_2$-bit separation words for use with each $n_1$-bit information word;

means for generating an evaluation signal corresponding to at least one parameter of a step response produced by modifying each $n_2$-bit information word and each respective possible $n_2$-bit separation word by an integrating transfer function characteristic including information with respect to said predetermined frequency range;

means for selecting one of said possible $n_2$-bit separation words for each respective $n_1$-bit information word in response to said evaluation signal; and means for adding each said selected one of said possible $n_2$-bit separation words following each respective one of said $n_1$-bit information words to form said encoded binary digital information signal having said format with substantially reduced components thereof in said predetermined frequency range.

14. Apparatus according to claim 13; in which said means for converting includes first memory means for producing an $n_1$-bit information word in response to each m-bit information word, and said means for generating includes second memory means for producing said set of possible $n_2$-bit separation words for use with each $n_1$-bit information word.

15. Apparatus according to claim 14; in which said means for generating includes third memory means for generating a first signal corresponding to said at least one parameter of a step response produced by modifying each $n_1$-bit information word by said integrating transfer function characteristic, fourth memory means for generating a second signal corresponding to said at least one parameter of a step response produced by modifying each $n_2$-bit separation word by said integrating transfer function characteristic, and means for generating said evaluation signal in response to said first and second signals corresponding to associated $n_1$-bit information words and $n_2$-bit separation words.

16. Apparatus according to claim 15; in which said first, second, third and fourth memory means each include a read-only memory.

17. Apparatus according to claim 14; in which said means for selecting includes selector means supplied with said possible $n_2$-bit separation words from said second memory means and optimum redundant word determination means for controlling said selector means to gate the selected $n_2$-bit separation word for each respective $n_1$-bit information word in response to said evaluation signal.

18. Apparatus according to claim 17; in which said means for adding includes register means supplied with each selected $n_2$-bit separation word from said selector means and each respective $n_1$-bit information word from said first memory means to produce said n-bit channel words which form said encoded binary digital information signal.

19. A method of decoding an encoded binary digital information signal comprised of n-bit channel words, during reproduction, each n-bit channel word being comprised of an $n_1$-bit information word and an $n_2$-bit separation word, the encoded binary digital information signal having a synchronizing signal added thereto and having a format with substantially reduced components thereof in a predetermined frequency range, to form an original binary digital information signal comprised of m-bit information words where $n_1 > m$, said method comprising the steps of:

detecting said synchronizing signal;

extracting said encoded binary digital information signal in response to said detection of said synchronizing signal;

separating each of said $n_1$-bit information words from each of said n-bit channel words comprising said extracted encoded binary digital information signal; and converting each separated $n_1$-bit information word to a corresponding m-bit information word to form said original binary digital information signal.

20. Apparatus for decoding an encoded binary digital information signal comprised of n-bit channel words, during reproduction, each n-bit channel word being comprised of an $n_1$-bit information word and an $n_2$-bit separation word, the encoded binary digital information signal having a synchronizing signal added thereto and having a format with substantially reduced components thereof in a predetermined frequency range, to form an original binary digital information signal comprised of m-bit information words where $n_1 > m$, said apparatus comprising:

means for detecting said synchronizing signal;

means for extracting said encoded binary digital information signal in response to said detection of said synchronizing signal;

means for separating each of said $n_1$-bit information words from each of said n-bit channel words comprising said extracted encoded binary digital information signal; and means for converting each separated $n_1$-bit information word to a corresponding m-bit information word to form said original binary digital information signal.

* * * * *